United States Patent [19]

Demler et al.

[11] 3,755,291

[45] Aug. 28, 1973

[54] PROCESS FOR IMPROVING THE DRY STATE TINCTORIAL STRENGTH OF A WATER SOLUBLE AZO DYE

[75] Inventors: Walter R. Demler, Hamburg; Paul G. Christ, Williamsville, both of N.Y.

[73] Assignee: Allied Chemical Corporation, New York, N.Y.

[22] Filed: Oct. 15, 1969

[21] Appl. No.: 870,763

Related U.S. Application Data

[62] Division of Ser. No. 598,164, Dec. 1, 1966, abandoned.

[52] U.S. Cl............... 260/200, 99/141, 99/148, 260/163, 260/184, 260/186, 260/191, 260/197, 260/208
[51] Int. Cl............................................. C09b 67/00
[58] Field of Search........................... 260/208, 200

[56] References Cited
UNITED STATES PATENTS 3,519,617  7/1970  Rast et al............................ 260/200
3,016,384  1/1962  Caliezi............................. 260/314.5

*Primary Examiner*—Lewis Gotts
*Assistant Examiner*—C. F. Warren
*Attorney*—Jay P. Friedenson

[57] ABSTRACT

A process of preparing water-soluble azo dyestuffs having improved tinctorial strength in the dry state which comprises gradually growing crystals of the dye from a concentrated aqueous inorganic salt solution to form a crystalline mass of the dye, wherein the dye crystals have an average length greater than 40 microns and thereafter separating and drying the crystallized dye.

7 Claims, No Drawings

PROCESS FOR IMPROVING THE DRY STATE TINCTORIAL STRENGTH OF A WATER SOLUBLE AZO DYE

CROSS REFERENCE TO RELATED APPLICATION

This application is a divisional of co-pending application Ser. No. 598,164 filed Dec. 1, 1966 now abandoned.

This invention relates to the manufacture of water-soluble dyes and in particular to a method of preparing water-soluble dyes having improved tinctorial properties in the dry state.

Dyes in the dry state are used to color a variety of products. Many edible products, marketed in the so-called "instant form" as dry comminuted mixtures are colored with edible dyestuffs to enhance their acceptability. These products are commonly prepared by dry-mixing the ingredients with a dye. Particularly desirable features of a dye thus employed are solubility in the intended environment, which is usually water, and high tinctorial value in the dry state, so that the resulting colored food stuff has an attractive appearance. One of the most common applications of edible dyestuffs is in "sugar plating," that is the coloring of sugar by dry-mixing with the dye. Colored sugar is employed in the preparation of instant beverage mixes, confections, gelatin dessert mixes, cake decorations and the like.

An object of the present invention is to provide a process for the preparation of water-soluble dyestuffs having improved tinctorial value in the dry state. Another object of this invention is to provide a process for the preparation of water-soluble dyestuffs particularly well adapted for use in sugar plating operations. Further specific objects of the present invention are the provision of water soluble dyestuffs and a preparation therefor, which dyestuffs impart a high degree of color to sugar when employed as sugar plating agents.

We have discovered that water-soluble dyestuffs, having greatly improved tinctorial value in the dry state are obtained when the dye is crystallized from an aqueous salt solution in the form of crystals having an average length, taken along the longest axis, of at least 40 microns. Dry azo dyes prepared in accordance with our invention impart about 50 percent more color to dry mixes than is imparted by the same amount of conventionally prepared azo dyes. Thus, in order to obtain a particular degree of coloration of a dry mix, about 50 percent more conventionally prepared dye is required compared to the amount of dye needed when the dye has been prepared according to our method.

The improvement in tinctorial value of dyes in the dry state is obtained when the dye crystals are grown to an average length ranging from 40 microns to 150 microns or more. The larger crystal size is achieved with correspondingly increasing process difficulties and cost, for example, longer time periods and more exacting temperature control. For this reason, optimizing the benefits of increased tinctorial value with the economics of the process, it is preferred to prepare dye crystals having an average length of between about 40 and 120 microns. Dye crystals of this length commonly have a diameter of between about 0.5 and 5 microns.

It is usually necessary to screen dyestuffs intended for use in dry mixes so that the dye particles are of a suitable and relatively uniform size. Surprisingly, when the size of the instantly prepared dye crystals are reduced so as to allow them to pass easily through a sieve used for dyes employed in plating sugar, the dye crystals retain their high tinctorial properties. Therefore, the improvement in tinctorial properties of the dyes prepared according to our invention appears to depend on the crystal history of the dye, rather than the size of the dye particles in its final application.

The present method of preparing dyestuffs having improved tinctorial properties in the dry state is applicable to water-soluble azo dyes and in particular to non-toxic, water-soluble azo dyes for use in the coloring of foodstuffs, especially granular products such as salt, sugar and the like. The edible water-soluble azo dyes such as FD&C Yellow No. 5, FD&C Yellow NO. 6, and FD&C Red No. 2, prepared in accordance with the present invention are particularly well suited for sugar plating. The term "water-soluble" as employed herein is intended to include dyes having a solubility of greater than about 4 parts of dye per 100 parts of water at 20° Centigrade. Suitable dyes include water-soluble food dyes such as:

trisodium salt of 1-(4-sulfo-1-naphthylazo)-2-naphthol-3,6-disulfonic acid (i.e. FD&C Red No. 2)

trisodium salt of 3-carboxy-5-hydroxyl-1-p-sulfophenyl-4-p-sulfophenylazopyrazole (i.e., FD&C Yellow No. 5)

disodium salt of 1-p-sulfophenyllazo-2-naphthol-6-sulfonic acid (i.e., FD&C Yellow No. 6)

disodium salt of 8-amino-7-p-nitrophenylazo-2-phenylazo-1-naphthol-3,6-disulfonic acid (D&C Black No. 1)

monosodium salt of 4-p-sulfophenylazo-2(2,4-xylylazo)-1,3-resorcinol. (D&C Brown No. 1)

monosodium salt of 1-p-sulfophenylazo-2-naphthol (D&C Orange No. 4)

disodium salt of 1-xylylazo-2-naphthol-3,6-disulfonic acid. (D&C Red No. 5)

disodium salt of 8-amino-2-phenylazo-1-naphthol-3-6-disulfonic acid. (D&C Red No. 33)

The preparation of water-soluble dyestuffs is well known. Generally, such dyestuffs contain one or more water solubilizing groups, such as sulfo or carboxy groups which are present as, or are converted to, the salt form. These dyestuffs are usually prepared in an aqueous medium from which the dyestuff may be readily separated by the addition of an inorganic salt, e.g., sodium chloride, to reduce the solubility and "salt out" the dyestuff. On cooling the mixture, a crystalline slurry of the dye is obtained. In the preparation of water-soluble azo dyes a primary aromatic amine is diazotized with nitrous acid and the resulting diazonium salt is coupled with an arylamine in an aqueous acid or alkaline medium. The product is precipitated from solution as a crystalline mass of the dyestuff salt, by adjusting the salt concentration of the solution to salt out the dye, usually with the addition of sodium chloride, and then cooling the mixture to further reduce the dye solubility. The resultant crystalline slurry may then be concentrated by such means as filtration or centrifugation and purified by washing with a cold solution of an inorganic salt, e.g., sodium chloride. The washed cake, usually containing between 30 and 60 percent of solids in the form of crystals having an average length of between about 5 and 30 microns is then dried, for example in a circulating air dryer.

The improved dyestuffs in accordance with the present invention may be prepared by crystallization directly from the aqueous medium in which the dye is formed, e.g., the coupling liquor, or by redissolving and crystallizing, under conditions of relatively slow crystal growth until crystals having a length of greater than 40 microns result. Suitable crystallization conditions vary depending on the nature and concentration of the dye in solution. In general, appropriate crystal growth is achieved by maintaining the temperature of the aqueous solution of the dye betweem the saturation temperature and about 10°C. below the saturation temperature for a period of time sufficient to result in the formation of crystals of the desired size. For example, in the preparation of improved dye crystals of the disodium salt of 1-p-sulfophenylazo-2-naphthol-6-sulfonic acid (FD&C Yellow No. 6) from an aqueous solution, suitable conditions for the desired crystal growth may be effected by adjusting the salt concentration of the solution, through the addition of an inorganic salt such as sodium chloride, until the specific gravity of the solution is about 14° Baume, cooling the solution to a temperature between about 45 and 55°C. and maintaining this temperature range until the desired crystal growth results. Generally, a period of 6 to 7 hours under the stated conditions is sufficient to result in the production of a crystalline slurry wherein the average length of the individual crystals is greater than about 40 microns. If desired, seed crystals may be added to initiate crystallization. Agitation of the solution, as by stirring, during the crystallization is beneficial to good crystal growth.

The crystalline mass may then be separated, for example, by filtration, washed with a dilute salt solution, and dried. Various drying conditions, i.e. temperatures and pressures may be employed. In practice it has been found preferable to subject the washed filter cake to a preliminary drying at relatively low temperatures, such as from 15° to 40°C., and moderately reduced pressure, preferably from about 4 to 25 mm of mercury until the moisture content is reduced to below about 15 percent, and then to a further drying at atmospheric pressure and a temperature between about 100° and 140°C., until the product is substantially dry.

In coloring foods such as sugar, the dyestuff, comprising crystals having an average length of 40 microns or more, preferably between 40 and about 80 microns is dry-blended with the desired food stuff in a conventional manner. Various mixers such as helical ribbon mixers, paddle mixers, double cone mixers, tumbling barrels and the like may be employed. The proportions of dye crystals used may vary considerably depending on the particular dye and the depth of color desired. For example, the dye may be blended with the food stuff in ratios ranging from 0.001 percent by weight or less of the dye to 20 percent or higher, depending on the depth of color desired. The degree of color and brightness obtained in dry-mixed compositions prepared from the improved dye crystals of the present invention has been found to be notably higher than that obtained with the same compositions employing the dyestuffs of the prior art, which are chemically similar but are prepared from substantially smaller crystals. Dyestuffs employed in dry mixes are commonly dried and screened and if necessary ground to a suitable particle size for the intended application. For example, in the coloring of granulated sugar, the dyestuff is preferably crushed to the extent necessary to pass a 200 mesh sieve, U. S. Standard Sieve Series, (74 microns) to achieve good adherence to the sugar granules.

The following examples described specific embodiments of our invention and illustrate the best method contemplated for carrying it out; but they are not to be interpreted as limiting the invention to all details thereof, since changes can be made without departing from the scope or spirit of the invention. In the examples, all parts and percentages are by weight and all temperatures are in degrees centigrade, unless otherwise indicated.

EXAMPLE 1

Thirty-six parts of sodium sulfanilate was added, at room temperature (24°), to 500 parts of water and 18 parts of a 50 percent aqueous solution of sodium hydroxide. The solution was stirred and then acidified by the addition of 68 parts of hydrochloric acid (20° Baume solution). Forty-eight parts of a 4 normal solution of sodium nitrite (13.2 parts of sodium nitrite) was added, with stirring, over a ½ hour period. Stirring was continued an additional one-half hour, at about 25°, to permit completion of the diazotization. The diazo sulfanilic slurry was added, over a 1 hour period, to a solution of 48.7 parts of the sodium salt of 2-naththolsulfonic acid (Schaeffer salt) and 35.6 parts of soda ash in 750 parts of water. The mixture was stirred for about 18 hours following the coupling reaction. The reaction mixture was then heated to 60° and 115 parts of sodium chloride and 3.5 parts of disodium phosphate were added. The mixture was heated to 70° and filtered to remove traces of insoluble material.

The specific gravity of the solution was adjusted to 14° Baume by the addition of 50 parts of sodium chloride. The solution was then cooled to 56° and maintained at that temperature, with stirring, for a period of 21 hours to permit crystal growth. The resultant crystalline slurry was filtered and the filter cake was washed with cold (0° to 5°) aqueous sodium chloride (3% NaCl).

The filter cake, composed of needle-like crystals of FD&C Yellow No. 6 having an average length of between 40 and 70 microns, taken along the longest axis, was dried at a temperature of 30° and a pressure of 15 millimeters of mercury for 64 hours and then at a temperature of 120° and atmospheric pressure for an additional 24 hours.

A quantity of the yellow dye, thus prepared, was crushed sufficiently so as to pass through a 200 mesh screen (U. S. Standard Sieve Series). A mixture of 0.3 parts of the dye and 680 parts of granulated sugar was thoroughly blended in a paddle-type mixer.

For purposes of comparison, a second blend was prepared, following the same screening and blending procedures, except that conventional FD&C Yellow No. 6, prepared from dye crystals having an average length of between 5 and 10 microns was employed. The two blends were compared by pouring small portions onto white filter paper and examining visually.

Each blend was assigned a rating of from 1 to 8 to indicate the degree of coloration. On this scale, for example a blend having a rating of 6 indicates a degree of coloration 6 times that of a blend having a rating of 1. Stated another way, to achieve the same color in a dry mix requires only one-sixth the amount of a dye having a rating of 6 as is required of a dye having a rating of one. In this case the blend containing the conventional dye was found to have a rating of about 4 while the blend containing the dye prepared from dye crystals of 40 to 70 microns length was found to have a rating of 6, indicating about a 50 percent greater degree of coloration for the latter blend. Thus, the relative coloring power of the two dyes, in dry mixes, is such that where 15 grams of the conventional dye is required to achieve a given color in a dry mix, only about 10 grams of the dye prepared from crystals of 40 to 70 microns length is required to achieve the same color.

When one gram of each sugar-dye blend is dissolved in 100 milliliters of water, no difference is found in the degree of coloration of the solutions, even though substantial differences were found in the dry blends from which the solutions were prepared.

EXAMPLE 2

A quantity of FD&C Yellow No. 6, comprising cystals having an average length of between 70 and 150 microns, was dried and screened through a 200 mesh screen in the manner described in Example 1.

A mixture of 0.3 parts of the dye and 680 parts of granulated sugar was blended in a paddle-type mixer, as in Example 1. A second control blend was prepared following the same drying, screening and blending procedures, except that FD&C Yellow No. 6 prepared from dye crystals having an average length of between 20 and 30 microns was employed. The coloring power or "plating" efficiency of the dyes was evaluated as follows:

Spectrophotometric measurement of the reflectance of each blend was made against a $BaSO_4$ standard. The measurements were made on a Color Eye, Signature Model D-1 Instrument Development Labs, Attleboro, Mass., using a filter, the peak wavelength of which most closely corresponded to the wavelength of minimum reflectance of the control sample. The ratios (K/S) of absorption (K) to scattering (S) coefficients were computed from the reflectance values in accordance with the mathematics of Kubelka and Munk (Zeitschrift fur Technische Physik, Vol. 12, 593–601 (1931). The tables of reflectance and K/S relationships found in *Color in Business, Science and Industry*, D. B. Judd, John Wiley and Sons, Inc., New York (1952) pages 358–362, were used.

The measurements indicated a K/S ratio for the blend containing dye prepared from the large (70–150 micron) crystals to be 1.5 times that of the K/S ratio of the control sample. Thus the dye prepared in accordance with our invention has 50 percent greater coloring power and imparts 50 percent more color to dry mixes than the conventionally prepared dye.

When a one gram sample of each of the sugar-dye blends is dissolved in 100 milliliters of water, the degree of coloration of each of the two solutions is found to be the same.

We claim:

1. In a process of preparing a dry, water-soluble azo dye by gradually growing crystals of said dye from a concentrated aqueous inorganic salt solution to form a crystalline mass of said dye, separating and drying the crystalline mass, the improvement which consists essentially of employing as the dye, a dyestuff having a water-solubility of greater than about 4 parts of dye per 100 parts of water at 20°C. and growing the crystals of said dye to an average length ranging from 40 microns to 150 microns.

2. A process as defined in claim 1 wherein the crystals of said dye have an average length of 40 to 120 microns.

3. A process as defined in claim 1 wherein the crystals of said dye have an average length greater than 70 microns.

4. The process defined in claim 1 wherein said crystals of said dye are grown from a concentrated aqueous salt solution at a temperature between the saturation temperature of said solution and about 10° below the saturation temperature.

5. A process as defined in claim 4 wherein the inorganic salt is sodium chloride.

6. The process according to claim 5 wherein said dye is the disodium salt of 1-p-sulfo-phenylazo-2-naphthol-6-sulfonic acid.

7. The process according to claim 5 wherein said concentrated salt solution is adjusted to a specific gravity of about 14° Baume and said crystals are grown at temperature of about 50° to 60°C. for a period of from about 4 to 21 hours.

* * * * *